United States Patent
Miranda

[11] 3,888,134
[45] June 10, 1975

[54] ECCENTRIC SHAFT MOUNTING APPARATUS

[76] Inventor: Lawrence Thomas Miranda, 1064 Puolo Dr., Honolulu, Hawaii 96818

[22] Filed: June 3, 1974

[21] Appl. No.: 475,898

[52] U.S. Cl. .............. 74/405; 74/409; 74/421 R; 74/606 R; 308/62
[51] Int. Cl. .... F16h 57/00; F16h 55/18; F16h 1/04
[58] Field of Search ............... 308/31, 32, 33, 62; 74/405, 421 R, 606, 409, 392

[56] References Cited
UNITED STATES PATENTS

| | | | |
|---|---|---|---|
| 3,342,507 | 9/1967 | Koch et al. | 308/62 X |
| 3,504,952 | 4/1970 | Farmer | 308/62 X |
| 3,811,335 | 5/1974 | Hunsberger | 74/409 |

Primary Examiner—Leonard H. Gerin
Attorney, Agent, or Firm—James C. Wray

[57] ABSTRACT

A power transmission apparatus employs interchangeable shafts rotatably mounted in discs formed with off-center shaft mounting apertures. The eccentrically drilled discs are rotatably mounted in a supporting frame, so that they can be rotated to adjust the position of a rotary shaft with respect to the supporting frame. The apparatus uses a plurality of interchangeable rotary shafts, each with an attached gear of different diameter. The eccentric disc allows each of the different size gears and attached shafts to be positioned in such a way that the interchangeable gear engages a second, non-interchangeable gear attached to a shaft rotatably mounted to the supporting frame. The apparatus permits the gear ration of the pair of gears in the transmission apparatus to be varied without replacing both members of the gear pair and permits the position of the interchangeable rotary shaft to be adjusted with respect to the supporting frame.

25 Claims, 8 Drawing Figures

PATENTED JUN 10 1975 3,888,134

SHEET 2

ECCENTRIC SHAFT MOUNTING APPARATUS

BACKGROUND OF THE INVENTION

The invention described herein concerns a power transmission apparatus employing gear and wheel supporting shafts and shaft mounts. Conventional devices employ eccentric mounts to adjust the position of shafts without gears and to adjust the angle or force of engagement between pairs of shaft-mounted gears. The object of this invention is provide a versatile gear and shaft mounting system for power transmission devices.

A collection of devices of the type known in the prior art is found in the Official United States Patent Office Classification of Patents, particularly in Class 308, subclasses 31, 32, 33 and 62 and Class 74, subclass 405. Examples of such devices are found in U.S. Pat. Nos. 1,549,845, 2,920,497, 3,361,490 and 3,467,450.

In conventional power transmission systems employing a pair of gears, the gear shafts are usually mounted in a fixed position. To change the gear ratio of the system, both members of the gear pair must be replaced. The gear ratio of such a system cannot be varied by the replacement of one member of the gear pair, because any substituted gear must have a tooth structure and a pitch diameter nearly identical to that of the gear it replaced.

The invention described in U.S. Pat. No. 2,920,497 employs an eccentric mounting for a drive gear shaft to equalize the torque transmitted to a pair of driven gears. The apparatus has no provision for changing either the gear ratio of the system or the position of a rotation shaft on which any of the gears are mounted.

U.S. Pat. No. 1,549,845 uses eccentric shaft mountings to cause a greater or lesser engagement of the teeth of shaftmounted gears. The invention does not provide a means for changing the gear ratio of the device.

In U.S. Pat. No. 3,361,490, an eccentric shaft mount is used to vary the position of a plurality of shafts within the working volum of vacuum equipment.

U.S. Pat. No. 3,467,450 describes an eccentric mount for adjusting the position of a roller. Neither invention deals with the eccentrically-mounted shafts with attached gears.

A need exists for a power transmission system with variable gear ratio and variable rotary shaft position. A system of this sort is particularly need in the design of model racing cars where a variety of gear ratios and wheel base dimensions must be provided by one power transmission chassis to meet varied conditions of different tracks.

SUMMARY OF THE INVENTION

The present invention is a power transmission apparatus in which interchangeable shafts are rotatably mounted through eccentrically formed apertures in rotatably adjustable bushings. The bushings are attached to a supporting frame.

In one form of the invention a first gear is mounted on a first rotary shaft attached to the supporting frame by means of a non-adjustable mount. The first gear engages a second gear attached to a second interchangeable shaft, which is rotatably mounted to the supporting frame by an adjustable eccentric bushing. This configuration permits the gear ratio of the transmission apparatus to be changed without replacing both gears with a second pair of gears, the sum of whose diameters must equal the sum of the diameters of the original two gears. This power transmission system is particularly useful in the fabrication of model racing cars, which require a variety of gear ratios to duplicate the scaled speed capabilities of different vehicle prototypes and racetracks.

In another form of the invention, the eccentric bushings are used to vary the wheel height and wheel base of model racing cars. The present invention makes it possible to use one power transmission chassis with a large number of interchangeable model car bodies of diverse scale and body styles.

There are a number of preferred embodiments of the eccentric bushing assembly.

In one preferred embodiment, the interchangeable rotary shaft is mounted to the eccentric bushing by means of a ball bearing. The outer raceway of the ball bearing is wedged into a circular aperture in the eccentric bushing, which circular aperture is offset from the rotational center of the eccentric bushing. The inner raceway of the ball bearing is attached to the interchangeable rotary shaft.

In another preferred embodiment, the eccentric bushing is a disc-shaped eccentric, rotatably inserted into a circular aperture in the supporting frame. The disc eccentric is formed with a rotary shaft bearing aperture offset from the center of the face of the disc. Rotation of the eccentric disc changes the position of the rotary shaft mount with respect to the supporting frame.

In one form of the invention the disc eccentric is fixed to the supporting frame by bead welding it to the supporting frame in the desired position. In another embodiment, the disc eccentric and aperture in the supporting frame are formed with helical threads so that the disc eccentric can be screwed into the supporting frame.

In another embodiment, a disc eccentric of a thickness approximately equal to that of the supporting frame is formed with perimetric, annular flanges of a thickness of approximately one-half that of the supporting frame. The annular face of the flange is formed in the same plane as a circular face of the disc eccentric. The outside diameter of the flange is nearly the same as the diameter of corresponding aperture in the supporting frame. Circular apertures in the supporting frame are formed with annular flanges on the circular perimeters of the apertures of a thicknesss of approximately one-half that of the supporting frame. The inside diameter of these second annular flanges is approximately equal to that of the disc eccentric, and the annular faces of the flanges are in the same plane as a face of the supporting frame. This construction permits the disc eccentric to be inserted into a circular aperture from only one side. The system of interengaging, concentric flanges prevents the disc eccentric from passing completely through the circular aperture. A set screw is inserted adjacent to the circular aperture. The head of the screw is made sufficiently large to contact the annular flange of the disc eccentric so that the set screw may be employed to lock the disc eccentric in place and prevent it from passing out of the circular aperture from the side of the supporting frame through which it was inserted.

In another embodiment, the disc eccentric has an annular flange of a diameter larger than that of the circular apertures in the supporting frame. These annular flanges are formed with elongated perimetric slot apertures through which set screws may pass. The set screws are driven into the supporting frame to retain the disc eccentric in the desired position. The elongated perimetric apertures permit the disc eccentric to be rotated to change the position of the rotary shaft support with respect to the supporting frame.

In a number of embodiments, the apparatus of the present invention is employed in the power trains of model racing cars.

In one form, the rotary shafts are supported by a model racing car chassis frame. The car's engine is mounted on one side of a horizontal frame member, and the gear pair is mounted to a pair of rotary shafts on the other of the frame members. The driven gear of the gear pair and a rear driving wheel are attached to an interchangeable shaft rotatably supported by an adjustable disc eccentric.

In another form, the gear pair is housed within a gear box structure. The gear box has two parallel vertical walls which support both ends of the rotary shafts. A disc eccentric is mounted in each of the parallel walls to support the interchangeable rotary shaft and gear. The bearings for the interchangeable shaft are removable so that the shaft can be freed from the disc eccentric. The gear bot is equipped with an access port through which the freed shaft and gear assembly may be passed for removal and replacement.

An object of the present invention is to provide a two-gear power transmission apparatus whose gear ratio can be varied by replacing only one member of the gear pair.

Another object of the present invention is to provide a model car power transmission whose gear ratio can be varied by replacing one gear and rotary shaft assembly.

Another object of the present invention is to provide an apparatus for varying the wheel height and wheel base of model racing cars.

Another object of the present invention is to provide easily constructed and operated systems for the attachment of adjustable eccentric bushings employed as rotary shaft mounts.

These and other objects and features of the invention are apparent from the disclosure, which includes the specification with the foregoing and ongoing description and with the claims, and which includes the drawings.

DETAILED DESCRIPTION OF THE DRAWINGS

Figure 1:
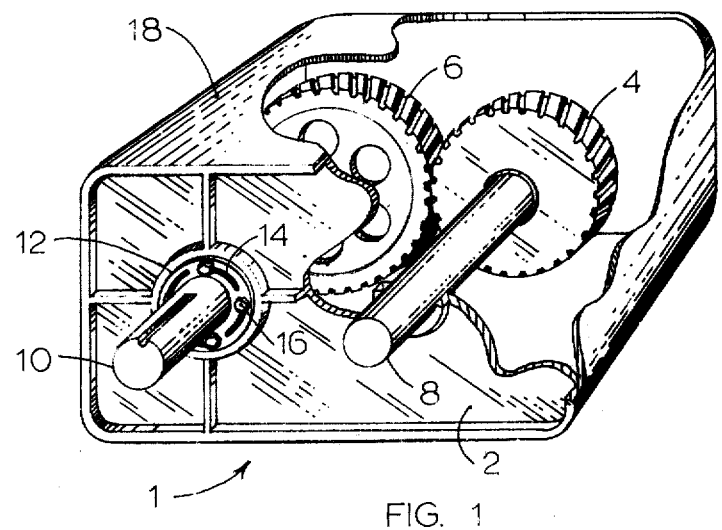
FIG. 1 is a perspective, cut-away view of an embodiment of the present invention wherein the gear system is housed in a gear box.

Referring to FIG. 1, a power transmission apparatus with eccentric shaft mounts is denoted generally by the numeral 1. A gear box structure 18 with a vertical side wall 2 houses two intermeshing gears 4 and 6. The first gear 4 is mounted on a rotary shaft 8. Rotary shaft 8 is permanently, rotatably mounted to two parallel walls of the gear box structure. The second gear 6 is attached to a second, interchangeable rotary shaft 10. The rotary shaft 10 is rotatably mounted in an adjustable eccentric bushing 12.

In the embodiment of the eccentric bushing shown, the eccentric bushing is in the form of a disc eccentric with a perimetric flange. Elongated, arc-shaped apertures 14 are formed near the perimeter of the flange. Set screws 16 pass through the apertures 14 and serve to retain the disc eccentric in position on the vertical wall of the gear box.

Figure 2:
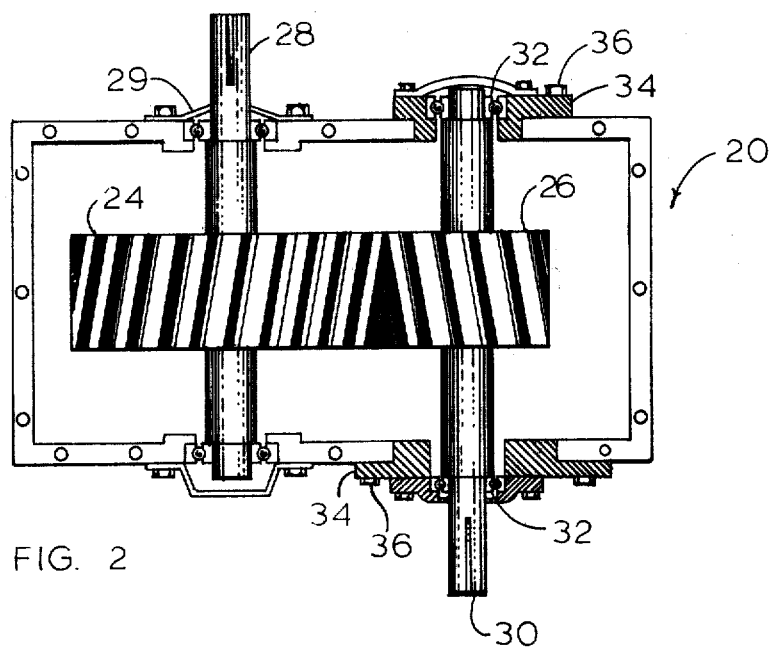
FIG. 2 is a top view of the apparatus of FIG. 1.

FIG. 2 is a top view of the power transmission apparatus of FIG. 1. A power transmission apparatus with adjustable eccentric shaft mounts is denoted generally by the numeral 20. A first gear 24 is mounted on a first rotary shaft 28, which passes through the center of the gear along the rotational axis of the gear. The first rotary shaft's axis of rotation is fixed by bearing mount 29, in which the shaft is rotatably mounted. The second gear 26 intermeshes with the first gear 24 and is attached to the interchangeable second shaft 30. The second shaft is rotatably mounted to two ball bearings 32, which contact the shaft on either side of the point of attachment of the second gear. The ball bearings are fixed to the disc eccentrics 34. The disc eccentrics are held in position on the gear box walls by set screws 36.

Figure 3:
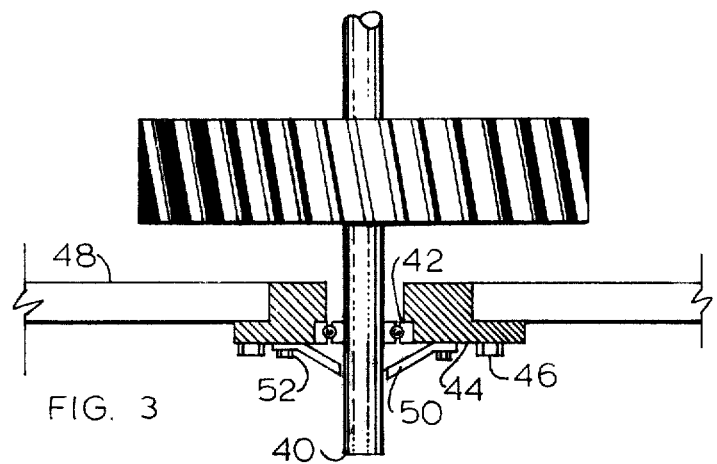
FIG. 3 is a top view of the rotary shaft mount of the present invention showing a method of attaching the eccentric bushing to the supporting frame.

FIG. 3 is a top view of the rotary shaft mount of an embodiment of the present invention. The interchangeable rotary shaft and gear assembly 40 is rotatably mounted in a disc eccentric 44 by means of a ball bearing 42. Bolts 52 fasten a shaft retainer and bearing cover 50 to the disc eccentric. The disc eccentric is capable of being rotated in the circular aperture in the supporting frame until the desired position of the shaft mount is attained. The disc eccentric is held in position in a circular aperture in the supporting frame 48 by set screws 46.

Figure 4:
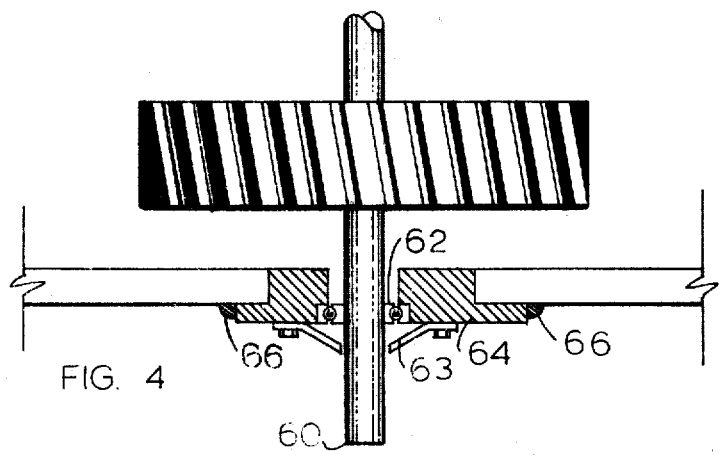
FIG. 4 is a top view of the rotary shaft mount of the present invention showing an alternate method of attaching the eccentric bushing to the supporting frame.

FIG. 4 is a top view of the rotary shaft mount of another embodiment of the present invention. The interchangeable rotary shaft and gear assembly 60 is rotatably mounted in a disc eccentric 64 by means of a ball bearing 62. A shaft retainer and bearing cover 63 is fastened to the disc eccentric.

The disc eccentric is fixed in position by weld beads 66.

Figure 5:
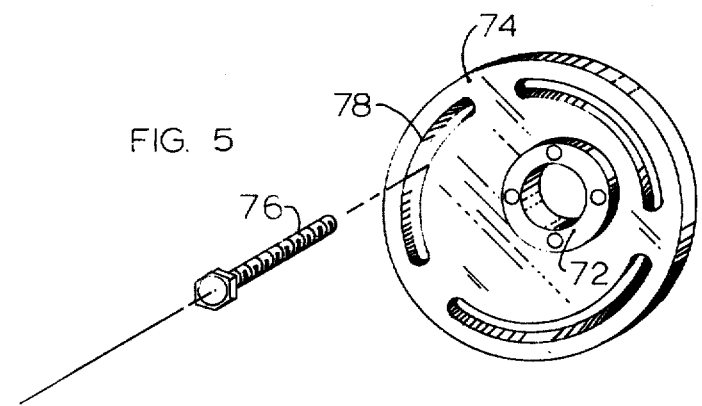
FIG. 5 is a perspective side elevation of a disc eccentric shaft mount of a preferred embodiment of the present invention.

FIG. 5 is a perspective side elevation of a disc eccentric shaft mount of a preferred embodiment of the present invention. The disc eccentric 74 is formed with an off center shaft mounting apertrue 72 and elongated perimetric apertures 78. Set screws 76 are passed through the apertures and are anchored in the supporting frame to retain the disc eccentric in the desired position.

Figure 6:
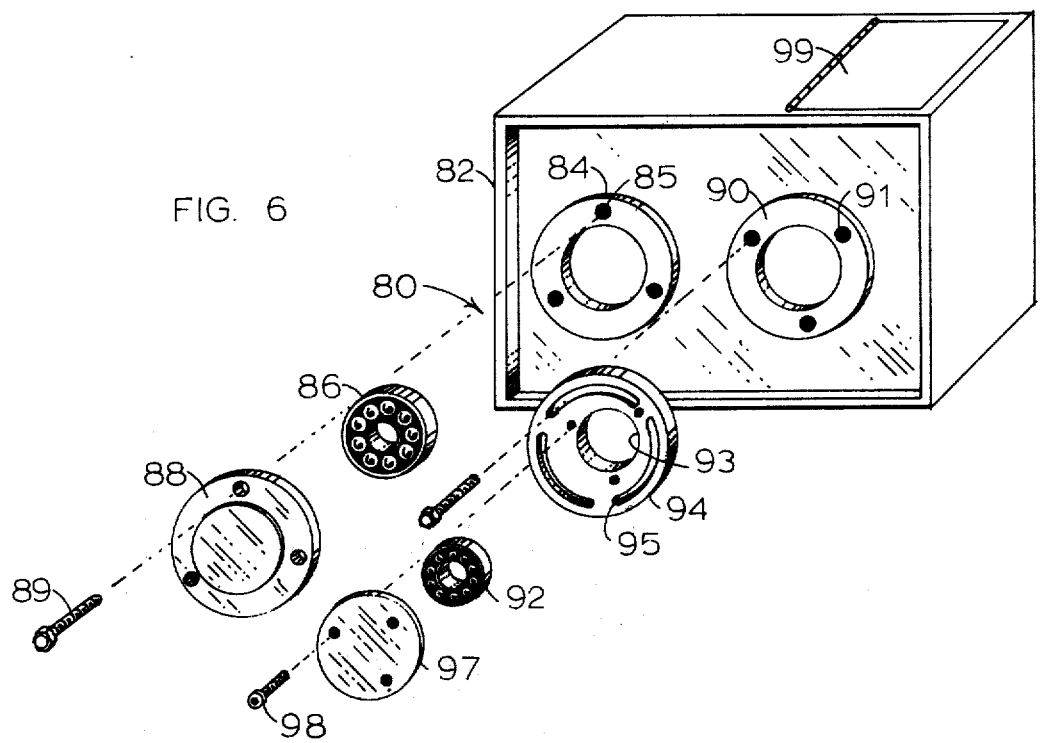
FIG. 6 is a schematic perspective view of the gear box structure of FIG. 1 showing the sequence of assembly of the shaft mounts.

FIG. 6 is a schematic perspective view of the sequence of assembly of the rotary shaft mounts of the present invention. A power transmission apparatus with eccentric shaft mounts is denoted generally by the numeral 80. Reinforced circular apertures 84 and 90 in the gear box 82 receive the shaft mounts. A fixed ball bearing 86 is inserted into aperture 84. The bearing is retained in position by cover 88, which is fastened to the gear box by bolts 89 driven into threaded holes 85 in the gear box. A disc eccentric 94 is mounted over the reinforced aperture 90. The disc eccentric is formed with an off center shaft mounting aperture 93 and elongated, perimetric apertures 95. The bearing 92 is inserted into the shaft mounting aperture 93 and covered by the circular cover plate 97. The cover plate is attached to the disc eccentric by bolts 98. The disc eccentric is capable of being rotated so that the shaft mount assumes the desired position with respect to the gear box. The disc eccentric is locked in the desired position by tightening set screws which pass through the elongated, perimetric apertures 95 and are anchored in screw holes 91. The gear box is provided with an entry port 99 through which the interchangeable rotary shaft and gear assemblies can be passed.

Figure 7:
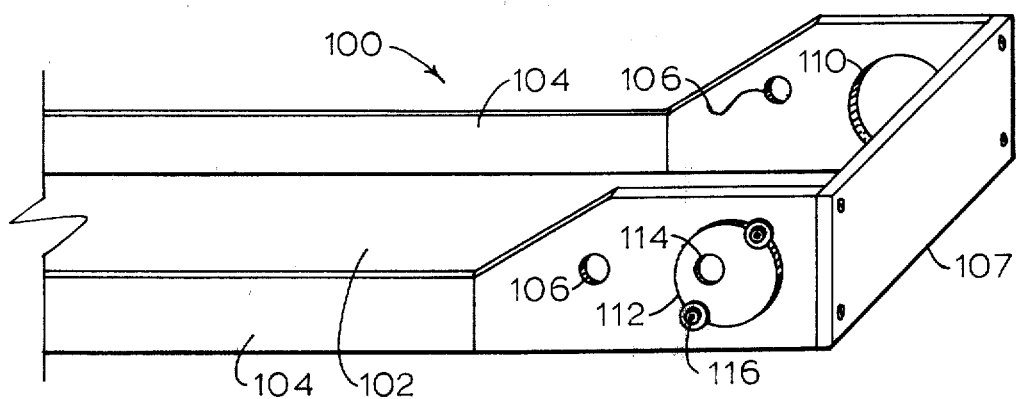
FIG. 7 is a perspective view of a model racing car chassis frame showing the location and structure of the shaft mounts.

In FIG. 7 a model car chassis frame is denoted generally by the numeral 100. The frame consists of two longitudinal members 104 and at least one transverse member 107. In one form of the invention, the front, undriven car wheels can be rotatably mounted on either side of the chassis frame by means of an axle, inserted through the off center apertures 114 in disc eccentrics 112. In this configuration the eccentrics can be rotated to adjust the height and longitudinal position of the model car wheels.

In another form, the chassis frame is used as a supporting frame for the power transmission of the model car. A first shaft and drive gear are supported by apertures 106. A second interchangeable shaft and driven gear are supported by the off center aperture 114 in the disc eccentric 112. Various rotary shaft and gear assemblies are placed in the shaft mount, and the position of the axis of rotation of the shaft are adjusted by rotating the disc eccentric. The disc eccentrics are locked in the desires position by tightening the flanged set screws 116.

Figure 8:
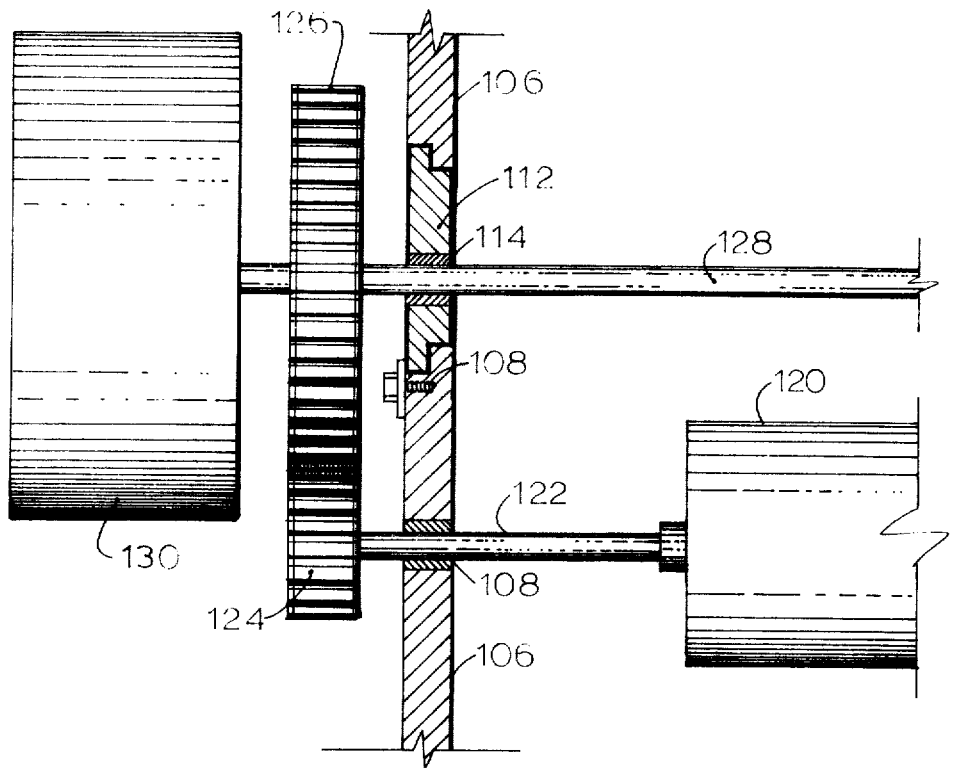
FIG. 8 is a top view of a model racing car drive train.

FIG. 8 is a top view of a model car drive train. A chassis frame member 106 is used to support a permanent, rotatably mounted shaft 122. An engine 120 on one side of the frame member is connected by the rotary shaft 122 to a first gear 124 on the opposite side of the frame member. The first gear 124 intermeshes with a second gear 126 mounted on a second rotary shaft 128. A model car drive wheel 130 is attached to the second rotary shaft. The second shaft passes through an off center aperture 114 in the disc eccentric 112. The position of the axis of rotation of the second rotary shaft is adjusted by rotating the flush mounted, flanged disc eccentrics 112. When the second shaft has been positioned so that the second gear 126 intermeshes with the first gear 124, the adjustable disc eccentrics are fixed in position by tightening down set screw 108.

While the invention has been described with reference to specific embodiments, it will be obvious that modifications and variations may be constructed without departing from the spirit and scope of the invention. The scope of the invention is described in the following claims.

I claim:

1. A power transmission apparatus with an adjustable, eccentric shaft mounting comprising:
   a. a supporting frame,
   b. a first rotary shaft rotatably mounted in the supporting frame,
   c. a first toothed wheel mounted on the first rotary shaft,
   d. rotatably adjustable eccentric bushings mounted in the supporting frame and capable of supporting a second rotary shaft at a point offset from the center of the eccentric bushing, and
   e. a plurality of interchangeable second rotary shaft and second gear assemblies, rotatably mountable in the eccentric bushings comprising a plurality of second rotary shafts and a plurality of second toothed wheels of various diameters, each mounted on one of the interchangeable second rotary shafts and each equipped with a tooth structure capable of intermeshing with the tooth structure of the first toothed wheel;
   whereby, a gear ratio of the power transmission apparatus can be adjusted by removing one second rotary shaft and second toothed wheel assembly from the eccentric bushings, mounting another second rotary shaft and second toothed wheel assembly on the eccentric bushings, and adjusting the eccentric bushings so that a replacement second rotary shaft and second toothed wheel assembly is supported in such a position that the tooth structure of the second toothed wheel engages the tooth structure of the first toothed wheel.

2. The power transmission apparatus of claim 1 wherein the first toothed wheel is the driving toothed wheel and the second toothed wheel is the driven toothed wheel.

3. The power transmission apparatus of claim 1 wherein the first toothed wheel is the driven toothed wheel and the second toothed wheel is the driving toothed wheel.

4. The power transmission apparatus of claim 1 wherein the second rotary shafts are rotatably mounted in the eccentric bushings by means of circular ball bearings and raceways mounted in the eccentric bushings.

5. The power transmission apparatus of claim 1 wherein the second toothed wheels are interchangeable on the second rotary shafts whereby the gear ratio of the power transmission apparatus may be varied by replacing one second toothed wheel with another second toothed wheel of a different diameter and adjusting the eccentric bushings so that the replacement second toothed wheel is supported in such a position that the tooth structure of second toothed wheel engages the tooth structure of the first toothed wheel.

6. The power transmission apparatus of claim 1 wherein the eccentric bushings are disc eccentrics formed with off center apertures to receive the second rotary shafts.

7. The power transmission apparatus of claim 6 wherein the disc eccentrics are set into circular apertures in the supporting frame so that the position of the off center apertures in the disc eccentrics can be adjusted with respect to the supporting frame by rotating the disc eccentrics within their respective circular apertures in the supporting frame.

8. The power transmission apparatus of claim 7 wherein the disc eccentrics are of a thickness approximately equal to that of the supporting frame and are formed with perimetric, first circular flanges of a thickness of approximately one-half that of the supporting frame, of an outside diameter approximately equal to that of the circular aperture in the supporting frame, and with an annular face in the same plane as a circular face of the disc eccentric; and wherein the circular apertures in the supporting frame are formed with second circular flanges on circular perimeters of the apertures of a thickness of approximately one-half that of the supporting frame, of an inside diameter approximately equal to that of the disc eccentric, and with an annular face in the same plane as a face of the supporting frame; whereby the disc eccentrics are flush mounted in the circular apertures in the supporting frame and are retained from passing through the circular apertures by a system of interengaging, concentric flanges.

9. The power transmission apparatus of claim 8 further comprising set screws insertable into the supporting frame adjacent to the circular apertures, with screw heads capable of engaging the first circular flanges of the disc eccentrics when the disc eccentrics are inserted into the circular apertures in the supporting frame, whereby the first circular flanges are retained in a position of engagement with the second circular flanges, and the disc eccentrics are thereby retained in the circular apertures in the supporting frame.

10. The power transmission apparatus of claim 7 wherein the disc eccentrics are welded in position on the supporting frame.

11. The power transmission apparatus of claim 7 wherein the disc eccentrics are formed with circular flanges of a diameter larger than that of the circular apertures in the supporting frame, which circular flanges are formed with elongated perimetric apertures to receive set screws driven into the supporting frame, whereby the disc eccentrics are adjusted and locked in fixed positions.

12. The power transmission apparatus of claim 7 wherein the disc eccentrics and the circular apertures in the supporting frame are formed with helical threads so that the disc eccentrics can be screwed into the apertures in the supporting frame.

13. The power transmission apparatus of claim 1 wherein the supporting frame is the chassis of a powered model racing car, whereby the gear ratio of the power transmission system may be varied to change the speed of the model racing car.

14. The power transmission apparatus of claim 1 wherein the supporting frame is the gear box of a powered model racing car, which gear box is comprised of two parallel sides, each formed with an aperture for receiving a rotatably adjustable eccentric bushing.

15. The power transmission apparatus of claim 2 further comprising a model racing car drive wheel mounted to the second rotary shaft, whereby the speed and position of the drive wheel are adjustable by rotating the adjustable, eccentric bushings and interchanging second rotary shaft and second toothed wheel assemblies.

16. An adjustable, eccentric wheel mounting apparatus for model cars comprising:
a chassis member,
rotatably adjustable eccentric bushings, mounted in the chassis member and capable of supporting a rotary shaft,
interchangeable, rotary shafts passing through the chassis and rotatably mounted in the eccentric bushings, and
a plurality of model car wheels of different diameters, each attached to an interchangeable rotary shaft;
whereby a distance between the model car wheels and a position of the rotary shafts with respect to the chassis member can be adjusted by rotating the eccentric bushings, and the size of the model car wheels can be changed by inserting a rotary shaft with an attached wheel of different diameter.

17. The adjustable, eccentric wheel mounting apparatus for model cars of claim 16 further comprising:
a first rotary shaft rotatably mounted to the chassis member,
a first toothed wheel mounted on the first rotary shaft,
a plurality of interchangeable second rotary shafts to which the model car's drive wheels are mounted and which second rotary shafts are rotatably mountable in the eccentric bushings,
a plurality of second, toothed wheels of various diameters, each mounted on one of the interchangeable second rotary shafts and each equipped with a tooth structure capable of intermeshing with the tooth structure of the first toothed wheel,
whereby a gear ratio of a model car power transmission apparatus can be adjusted by removing one second rotary shaft and second toothed wheel assembly from the eccentric bushings, mounting another second rotary shaft and second toothed wheel assembly on the eccentric bushings, and adjusting the eccentric bushings so that a replacement second rotary shaft and second toothed wheel assembly is supported in such a position that the tooth structure of the second toothed wheel engages the tooth structure of the first toothed wheel.

18. The adjustable, eccentric wheel mounting apparatus for model cars of claim 16 wherein the eccentric bushings are disc eccentrics formed with off center apertures to receive the second rotary shafts.

19. The adjustable, eccentric wheel mounting apparatus for model cars of claim 18 wherein the disc eccentrics are set into circular apertures in the chassis member so that the position of the off center apertures in the disc eccentrics may be adjusted with respect to the chassis member by rotating the disc eccentrics within their respective circular apertures in the chassis member.

20. The adjustable, eccentric wheel mounting apparatus for model cars of claim 19 wherein the disc eccentrics are of a thickness approximately equal to that of the chassis member and are formed with perimetric, first circular flanges of a thickness of approximately one-half that of the chassis member, of an outside diameter approximately equal to that of the circular aperture in the chassis member, and with an annular face in the same plane as a circular face of the disc eccentric; and the circular apertures in the chassis member are formed with second circular flanges on circular perimeters of the apertures of a thickness of approximately one half that of the chassis member, of an inside diameter approximately equal to that of the disc eccentric, and with an annular face in the same plane as a face of the chassis member, whereby the disc eccentrics are flush mounted in the circular apertures in the chassis member and are prevented from passing through the circular apertures by a system of interengaging, concentric flanges.

21. The adjustable, eccentric wheel mounting apparatus for model cars of claim 20 further comprising set screws insertable into the chassis member adjacent to the circular apertures, with heads capable of engaging the first circular flanges of disc eccentrics when the disc eccentrics are inserted into the circular apertures in the chassis member, whereby the first circular flanges are retained in a position of engagement with the second circular flanges, and the disc eccentrics are retained within the circular apertures in the chassis member.

22. The adjustable, eccentric wheel mounting apparatus for model cars of claim 19 wherein the disc eccentrics are welded in position on the chassis member.

23. The adjustable, eccentric wheel mounting apparatus for model cars of claim 19 wherein the disc eccentrics are formed with circular flanges of a diameter larger than that of the circular apertures in the chassis member, which circular flanges are formed with elongated perimetric apertures to receive set screws driven into the chassis member, whereby the disc eccentrics are adjusted and locked in a fixed position.

24. The adjustable, eccentric wheel mounting apparatus for model cars of claim 19 wherein the disc eccentrics and the circular apertures in the chassis member are formed with helical threads so that the disc eccentrics can be screwed into the apertures in the chassis member.

25. The adjustable, eccentric wheel mounting apparatus for model cars of claim 16 wherein the rotary shafts are rotatably mounted in the eccentric bushings by means of circular ball bearings and raceways mounted in the eccentric bushings.

* * * * *